United States Patent Office 3,729,469
Patented Apr. 24, 1973

3,729,469
4-(3-AMINO-2-HYDROXYPROPOXY)-1,2,5-THIADIAZOLE COMPOUNDS
Burton Kendall Wasson, Valois, Quebec, Canada, assignor to Charles E. Frosst & Co., Kirkland, Quebec, Canada
No Drawing. Application Apr. 21, 1969, Ser. No. 818,090, which is a continuation-in-part of abandoned application Ser. No. 731,333, May 22, 1968. Divided and this application Sept. 9, 1971, Ser. No. 179,145
Int. Cl. C07d 87/46
U.S. Cl. 260—247.1
9 Claims

ABSTRACT OF THE DISCLOSURE

4-[3-(substituted amino) - 2 - hydroxypropoxy]-1,2,5-thiadiazole compounds, optionally substituted in the 3-position of the thiadiazole nucleus which exhibit β-adrenergic blocking properties and thus are useful in the management of angina pectoris are described. The products are prepared by one of four principal methods (1) reaction of a 4-hydroxy - 1,2,5 - thiadiazole with epihalohydrin to provide 4-(3-halo - 2 - hydroxypropoxy)-1,2,5-thiadiazole which, upon treatment with alkali, forms the epoxide which is then reacted with an amine to provide the desired product; (2) reaction of a 3-chloro(or bromo)-4-(3 - substituted amino - 2 - hydroxypropoxy) - 1,2,5-thiadiazole with an amine or an N-containing heterocycle that replaces the 3-chloro group; (3) reductive alkylation of an

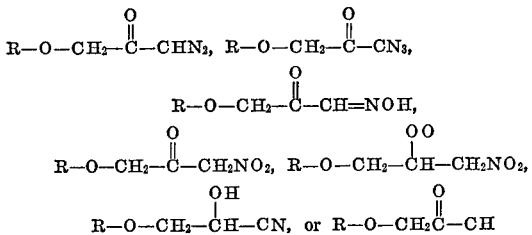

wherein R is the 1,2,5 - thiadiazole-4-yl group; and (4) reaction of a 3-substituted - 4 - (3-amino - 2 - hydroxypropoxy) - 1,2,5 - thiadiazole with a haloalkyl or other desired halogenated compound to provide the 3-substituted - 4 - (3-substituted amino - 2 - hydroxypropoxy)-1,2,5-thiadiazole.

---

This application is a division of my copending U.S. patent aplication, Ser. No. 818,090, filed Apr. 21, 1969, now Pat. No. 3,655,663 which in turn was a continuation-in-part of U.S. Ser. No. 731,333, filed May 22, 1968 (now abandoned).

This invention is concerned with 4 - [3 - (substituted amino) - 2 - hydroxypropoxy] - 1,2,5 - thiadiazole compounds which are optionally substituted in the 3-position of the thiadiazole nucleus. These compounds exhibit β-adrenergic blocking properties and have the marked advantages of having a long duration of action and being effective at very low dosage levels. Of particular interest are the 1,2,5-thiadiazole compounds having attached to the 4-position carbon a 3-(substituted amino) - 2 - hydroxypropoxy group wherein the hydroxy group may optionally be present in the form of an ester group and where the hydrogens attached to the propyl chain may optionally be replaced by lower alkyl substituents. The compounds, particularly when additionally substituted in the 3-position of the 1,2,5-thiadiazole nucleus, exhibit especially desirable β-adrenergic blocking properties and generally, though not necessarily, those having a non-bulky substituent attached to the 3-position exhibit potent but short-acting β-adrenergic properties whereas those having a bulky substituent attached in this position generally exhibit potent and long-acting β-adrenergic blocking properties.

The novel β-adrenergic blocking agents of this invention have the following structure wherein the atoms of the thiadiazole nucleus have been numbered and all product identification in the specification and claims shall be in accordance therewith:

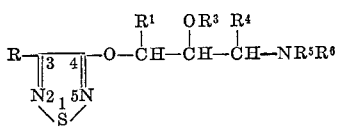

and pharmacologically acceptable salts thereof, wherein at least one of the variable radicals $R^1$, $R^3$, $R^4$, $R^5$ is other than hydrogen. In the above structure R represents (1) hydrogen, (2) halogen, preferably chloro or bromo, (3) lower alkyl having from 1 to 5 carbon atoms and either a straight or branched chain such as methyl, ethyl, propyl, isopropyl, butyl, iso-, secondary- or tert-butyl and amyl including all of its branched chain configurations, (4) lower alkenyl having from 2 to 5 carbons such as vinyl, allyl, methallyl and the like, (5) a group having the structure Y—X—Z— wherein Y is a straight or branched chain alkyl having 1 to 4 carbons, X is sulfur, and Z is alkyl having 1 or 2 carbons, (6) a lower alkoxy having from 1 to 5 carbon atoms and being either a straight or branched chain and including methoxy, ethoxy, propoxy, isopropoxy, butoxy, and pentoxy, the latter groups existing in either straight or branched configuration, (7) phenyl, (8) morpholino and (9) pyrryl; $R^1$ is selected from hydrogen and lower alkyl having from 1 to 3 carbons; $R^3$ is selected from hydrogen and benzoyl or lower alkanoyl wherein the alkanoyl group contains from 2 to 4 carbons; $R^4$ is selected from hydrogen and lower alkyl having from 1 to 3 carbons; $R^5$ represents hydrogen, lower alkyl having a straight or branched chain containing from 1 to 5 carbons, phenyl-lower alkyl wherein the alkyl moiety has from 1 to 3 carbons, and lower alkanoyl having from 2 to 5 carbons; $R^6$ represents (1) a straight or branched chain alkyl having from 1 up to about 20 carbons but preferably a branched chain alkyl having from 3 to 6 carbons such as isopropyl, tert-butyl, 2,2-dimethylpropyl and the like, optionally being substituted with a halophenoxy group, (2) an alkenyl alkinyl having preferably from 2 to 6 carbons, such as allyl, butynyl, propargyl and the like; and when $R^5$ and $R^6$ separately represent lower alkyl or lower alkenyl they additionally can be joined together either directly or through an oxygen or nitrogen to form a 4 to 6 membered ring with the nitrogen to which they are attached which heterocycles can optionally be substituted with a lower alkyl ($C_{1-3}$) to form, for example, the pyrrolidyl, piperidino, morpholino, hexahydroazepinyl, $\Delta^3$- or $\Delta^2$-piperidienyl, 1,2-dihydropyridyl and the like.

Suitable pharmacologically acceptable salts of product I are acid addition salts derived from inorganic acids, for example, hydrochlorides, hydrobromides, phosphates or sulfates or salts derived from organic acids, for example, oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,1′-methylene-bis(2-hydroxy-3-naphthoate) and the like.

The novel 4-[3-(substituted amino)-2-hydroxypropoxy]-1,2,5-thiadiazole compounds, structure I, as well as their intermediates which contain one asymmetric carbon atom in the propylene chain will be obtained as racemic compounds which can be separated into optically active isomers by known methods, for example, by forming a salt with an optically active acid, many of which are known to those skilled in the art, such as optically active tartaric, mandelic, cholic, O,O-di-p-toluoyl tartaric, O,O-dibenzoyl tartaric acids, or other acids conventionally employed for this purpose. Those novel products and intermediate compounds that contain two or more asymmetric carbons in the propylene chain will be obtained as diastereoisomers, and each diastereoisomer, of course, also will be obtained as a racemic compound which can be separated into its optically active isomers by known methods such as described above. Resolution of certain representative intermediate and end products will be described in the detailed examples. All products can be similarly resolved and the claims will be understood to embrace the products in the form of racemic compounds or diastereoisomers as well as in the form of the optically active isomers where appropriate.

The products of this invention wherein R is a nonbulky group such as hydrogen, halogen, lower alkyl, lower alkenyl and lower alkoxy generally are short-acting β-adrenergic blocking agents whereas when the substituent R is a more bulky substituent such as phenyl, morpholino or pyrryl, the products generally exhibit long-acting β-adrenergic blocking properties, and are substantially devoid of sympathomimetic properties.

Both the short-acting and long-acting β-adrenergic blocking agents are of value in therapy and each serves the need of certain patients requiring treatment with agents possessing this property.

The potential of a product as a β-adrenergic blocking agent conventionally is evaluated by the protocol which was employed to assess the β-blocking properties of the thiadiazole compounds of this invention. The protocol employed comprises intravenous administration of graded doses of the selected compound to rats which are then challenged with a standard dose of isoproterenol, a product known to be a β-stimulant. The $ED_{50}$ for representative products of this invention tested according to this protocol is included in certain of the examples that follow.

The clinical application of β-adrenergic blocking agents are well known to physicians. One use for the novel products of this invention, which constitutes the best mode for use of the products known to applicant at this time, is for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where a short-acting or long-acting agent is needed, such as in the management of angina pectoris.

The products can be prepared in pharmaceutical formulations suitable for oral or parenteral administration preferably in the form of tablets, solutions, suspensions and emulsions. The 1,2,5-thiadiazoles can be formulated in the form of the free base or in the form of their salts in conjunction or admixture with organic and/or inorganic solid or liquid pharmaceutical excipients. No special problems are involved in preparing suitable formulations of these products and methods generally employed for this purpose, which are known to those skilled in this art, are entirely suitable. If desired the compounds can be administered along with or formulated together with other active ingredients. Dosage units of from about 2 mg. to 10 mg. can be provided for the symptomatic adjustment of dosage by the physician depending upon the age and condition of the patient.

The novel thiadiazole products I of this invention can be prepared by one or more of the following routes:

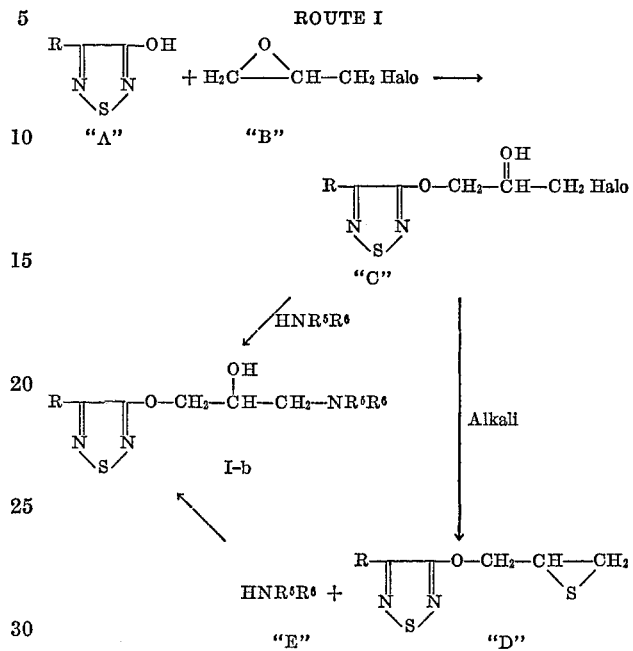

The 3-R-4-hydroxy-1,2,5-thiadiazole (A) is treated with epichlorhydrin or epibromhydrin (B) to provide product "C" which can be separated from the reaction mixture by extraction with ether. Ideally, the epihalohydrin is used in excess for its solvent properties and the reaction proceeds at room temperature or with heating up to about 90° C. with optimum results being obtained by heating at a temperature between about 55-70° C. The reaction of "A" and "B" is additionaly facilitated by the presence of a trace of base which serves as a catalyst, preferred catalysts being piperidine, piperidine hydrochloride, pyridine or other heterocyclic bases. After extraction the intermediate product "C" is shaken with aqueous alkali to afford the epoxide (D). Aqueous sodium or potassium hydroxide are preferred at a concentration of about 20% for best yields. Treatment of the epoxide "D" with the amine "E" provides the desired thiadiazole product I-b. Advantageously an excess of the amine is employed for its solvent properties; from 3 to 5 moles of the amine being adequate to give very good yields of the desired product. Larger quantities of course can be employed if so desired. This step can be carried out at a temperature between about ambient temperature and 90° C. although it is preferred to use temperatures between about 60–70° C. It has also been found that certain amines, particularly branched chain monoalkyl amines, as neopentylamine, can be refluxed with the intermediate product "C" to give the desired product I-b directly.

When any one or more of the variables $R^1$ and $R^4$ is a lower alkyl, product I can be prepared by the reaction of starting substance "A" with an α-haloalkanoic acid of the structure

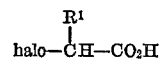

to provide 3-R-4-α-carboxyalkoxy-1,2,5-thiadiazole which is converted by conventional methods to the acid chloride. Reaction of the acid chloride with a diazoalkane of the structure $R^4CH-N_2$ gives the 3-R-4-(3-chloro-3-$R^4$-2-oxo-1-$R^1$-propoxy)-1,2,5-thiadiazole which upon reduction, preferably with sodium borohydride, affords the intermediate "C," which is converted to the thiadiazole I–c by the procedures described above. This alternative method can, of course, be employed for preparing products wherein $R^1$ and $R^4$ are hydrogen.

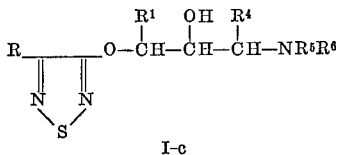
I–c

When $R^3$ of product I is benzoyl or lower alkanoyl, compound I–b or I–c is reacted with the desired acid anhydride or chloride at ambient temperature or with brief warming up to about 100° C. whereupon a good yield of the desired product I is formed.

Many of the thiadiazole starting materials, "A," are known compounds or can be made from known starting materials. In general, the process for making the thiadiazoles "A" comprises the reaction of an $$R—ClCH—CONH_2$$

with ammonium hydroxide to provide the corresponding α-R-α-amino-acetamide hydrochloride which product, when reacted with $SCl_2$, $S_2Cl_2$, $SOCl_2$ or thionylaniline, provides the desired thiadiazole "A." It is sometimes more convenient to prepare the α-amino-acetamide product from an α-amino acid such as an $$R—CH(NH_2)—CO_2H$$

by treatment with acetyl chloride in methanol to form the ester which upon treatment with a large excess of ammonium hydroxide forms the desired α-amino-acetamide which then can be treated with $SCl_2$, $S_2Cl_2$, $SOCl_2$ or thionylaniline to provide the thiadiazole "A."

properties and from about 3 to 5 moles of amine have been found to give optimum yields. Larger quantities can, of course, be employed, if desired.

Various modifications can be made in the above preferred methods for preparing the products of this invention. For example, when starting material "A" in Route I is the 3-chloro (or bromo)-4-hydroxy-1,2,5-thiadiazole, it can be reacted with product "F" (see Route II) thereby introducing the desired morpholino group in the 3-position of the thiadiazole nucleus. Also, when R in product "D" (see Route I) is chloro or bromo, product "D" can be reacted with morpholine "F" whereupon it will first react with the epoxide portion of the product and then, by increasing the temperature, it will replace the chloro or bromo group thereby forming a product of the structure:

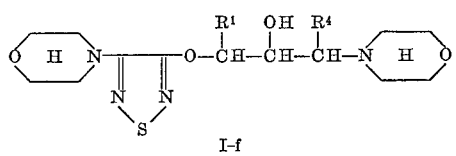
I–f

As is usual, morpholine is employed in excess for its solvent properties and the second stage of the reaction advantageously is carried out at a temperature from between about 110–150° C. although preferably at between about 125–135° C. to introduce the morpholino group into the 3-position. In some instances it may be advantageous to carry out this reaction in a sealed vessel.

Another route for preparing the novel products of this invention comprises forming the substituted amino group in situ by reductive alkylation illustrated by the following scheme:

ROUTE III

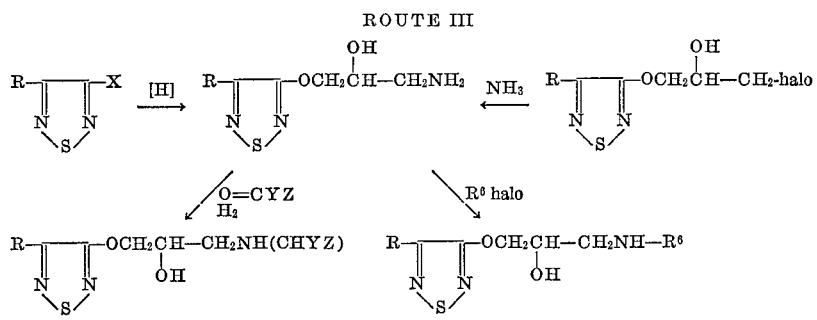

Another route by which novel compounds of this invention can be prepared can be illustrated as follows:

ROUTE II

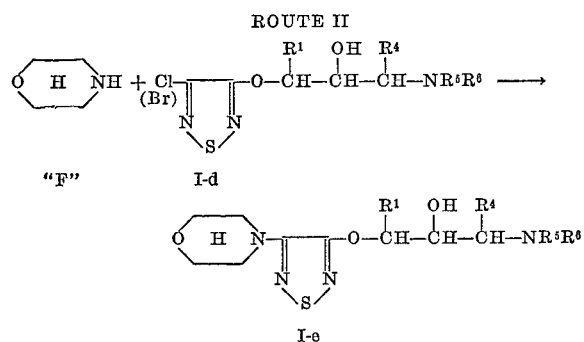

In the second route, treatment of the thiadiazole, I–d (prepared by the method described in Route I) with an amine, "F," affords the appropriately 3-substituted product I–e. When the amine "F" is a primary or secondary amine, the reaction advantageously is carried out under pressure; however, when the amine is a heterocycle of the type defined hereinabove the reaction readily takes place without pressure by heating the reactants at a temperature between about 100–150° C. but preferably at a temperature between about 125–135° C. A slight excess of the amine "F" generally is used for its solvent X is $$-O-CH_2-\overset{O}{\underset{\|}{C}}-CHN_2 \quad -O-CH_2-\overset{OH}{\underset{|}{C}H}-CH_2-NO_2$$

$$-O-CH_2-\overset{O}{\underset{\|}{C}}-CN_3 \quad -O-CH_2-\overset{OH}{\underset{|}{C}H}-CN$$

or $$-O-CH_2-\overset{O}{\underset{\|}{C}}-CH=NOH \quad -O-CH_2-\overset{O}{\underset{\|}{C}}-CN$$

$$-O-CH_2-\overset{O}{\underset{\|}{C}}-CH_2-NO_2$$

Y is preferably a saturated or unsaturated lower alkyl ($C_{1-5}$), hydroxy-lower alkyl ($C_{2-5}$), lower cycloalkyl ($C_{3-6}$) or phenyl;

Z is lower alkyl ($C_{1-5}$), and when

Y and Z are each lower alkyl they can be linked together to form a 3- or 6-membered carbocyclic ring with the carbon to which they are attached;

R has the meaning hereinbefore assigned.

As catalyst, palladium on charcoal or lithium aluminum hydride as reducing agent, advantageously is employed.

The following examples will illustrate representative products of this invention prepared by the above described procedures. It will be understood that these compounds can be prepared by either Route I or Route II or a combination or modification of these routes as described above. The following examples therefore are not to be considered as limiting the preparation of any particular compound to the method described in the example as the examples are provided solely to illustrate the best modes currently known to applicant for the preparation of the novel thiadiazoles of this invention.

EXAMPLE 1

3-chloro-4-(3-tert-butylamino-2-hydroxy-propoxy)- 1,2,5-thiadiazole

Step A.—Preparation of 3 - chloro - 4 - (2,3 - epoxy-propoxy) - 1,2,5 - thiadiazole: A mixture of 30 g. (0.22 mole) of 3-chloro-4-hydroxy-1,2,5-thiadiazole, 71 g. (0.77 mole) of epichlorohydrin, and 0.6 ml. of piperidine is maintained at 65–70° C. for two hours. Excess epichlorohydrin is removed at about 95° C. using water-pump vacuum. The residual viscous gum, 55.5 g., is dissolved in diethyl ether and refrigerated. The supernatant ethereal liquor is drawn off and evaporated to dryness giving 20.2 g. of a viscous oil that is then stirred for about one-half hour with 150 ml. of 10% sodium hydroxide solution. The mixture warms up slightly during this treatment. The mixture then is extracted with diethyl ether, washed with water, and evaporated to yield 20.2 g. of crude 3-chloro-4-(2,3-epoxypropoxy)-1,2,5-thiadiazole.

Step B.—Preparation of 3-chloro-4-(3-tert-butylamino-2-hydroxypropoxy) - 1,2,5 - thiadiazole hydrochloride: A mixture of 40.2 g. (0.21 mole) of 3-chloro-4-(2,3-epoxypropoxy)-1,2,5-thiadiazole and 76 g. (1.05 mole) of tert-butylamine is heated and stirred at 60–70° C. for two and one-half hours. Excess tert-butylamine is removed in vacuo giving 42.4 g. of residual crude product. The latter is dissolved by shaking with a mixture of diethyl ether and water containing 2.5 g. of sodium hydroxide. The ethereal phase is separated and the aqueous phase is extracted with several portions of diethyl ether. The ethereal extracts are combined, washed with small volumes of water and then treated with excess 3 N hydrochloric acid. The aqueous layer is separated, evaporated to dryness, and the resulting residue is dried by azeotropic distillation of benzene ethanol. The crystalline solid is recrystallized from ethanol diethyl ether giving 31.3 g. (49.5%) of 3-chloro-4-(3-tert-butylamino-2-hydroxypropoxy) - 1,2,5 - thiadiazole hydrochloride, M.P. 159–161° C. Recrystallization from the same solvent mixture gives product melting at 161–163° C. ($ED_{50}$=0.093 mg./kg.).

Analysis.—Calcd. for $C_9H_{17}Cl_2N_3O_2S$ (percent): C, 35.77; H, 5.67; Cl, 23.46; N, 13.90. Found (percent): C, 36.11; H, 5.37; Cl, 23.33; N, 13.82.

Step C.—Preparation of 3-chloro-4-(3-tert-butylamino-2-hydroxypropoxy)-1,2,5-thiadiazole: The 3-chloro-4-(3-tert-butylamino - 2 - hydroxypropoxy)-1,2,5-thiadiazole hydrochloride obtained in Step B is neutralized with aqueous sodium carbonate and the free base extracted with diethyl ether. After removal of the solvent, the residue is recrystallized from di-isopropyl ether giving the free base as colorless prisms, M.P. 78–79° C.

Analysis.—Calcd. for $C_9H_{16}ClN_3O_2S$ (percent): C, 40.66; H, 6.07; Cl, 13.34; N, 15.81; S, 12.07. Found (percent): C, 40.80; H, 6.18; Cl, 13.80; N, 16.00; S, 11.80.

EXAMPLE 2

3-morpholino-4-(3-tert-butylamino-2-hydroxypropoxy)- 1,2,5-thiadiazole hydrogen maleate A solution of 5.0 g. of 3-hydroxy-4-morpholino-1,2,5-thiadiazole (26.7 mmole) in 18.95 ml. of 1.41 N methanolic sodium methoxide is treated with 10.5 ml. of epichlorohydrin (134 mmole) and the mixture is stirred at 25° C. for 16 hours. The precipitated sodium chloride is filtered and washed with methanol. The filtrate is evaporated in vacuo to an oil residue. The residue is refluxed for 12 hours in 15 ml. t-butylamine and the excess amine evaporated in vacuo. The residue of crude 3-morpholino-4-(3 - tert-butylamino-2-hydroxypropoxy)- 1,2,5-thiadiazole free base (6.1 g.) is converted to the maleate salt and recrystallized from ethanol, M.P. 214–215° C.

EXAMPLE 3

3-morpholino-4-(3-tert-butylamino-2-hydroxypropoxy)- 1,2,5-thiadiazole, hydrogen maleate A mixture of 0.22 mole of 3-morpholino-4-hydroxy-1,2,5-thiadiazole, 71 g. (0.77 mole) of epichlorohydrin, and 0.6 ml. of piperidine is maintained at 65–70° C. for 2 hours. Excess epichlorohydrin is removed at about 95° C. in vacuo. The residual gum is dissolved in diethyl ether and refrigerated. The supernatant ethereal liquor is separated and evaporated to a viscous oil. An excess of t-butylamine is added and the mixture is heated at 100° C. for 10 hours in a sealed vessel. The product is isolated by the method described in Example 2 to 3-morpholino-4-(3-tert-butylamino-2-hydroxypropoxy( - 1,2,5 - thiadiazole, hydrogen maleate.

By following substantially the same procedure described in Examples 1, 2 or 3 but replacing the 3-chloro-4-hydroxy-1,2,5-thiadiazole in Example 1, Step A, and the amine employed in Example 1, Step B by the reactants "A" and "E" identified in the following table there are obtained thiadiazoles I–b which also are identified in Table I. The groups identified for the variable radicals R, $R^5$ and $R^6$ in the reagents "A" and "E" remain unchanged during the reaction and are the same R, $R^5$ and $R^6$ groups in the thiadiazole products I–b.

TABLE I

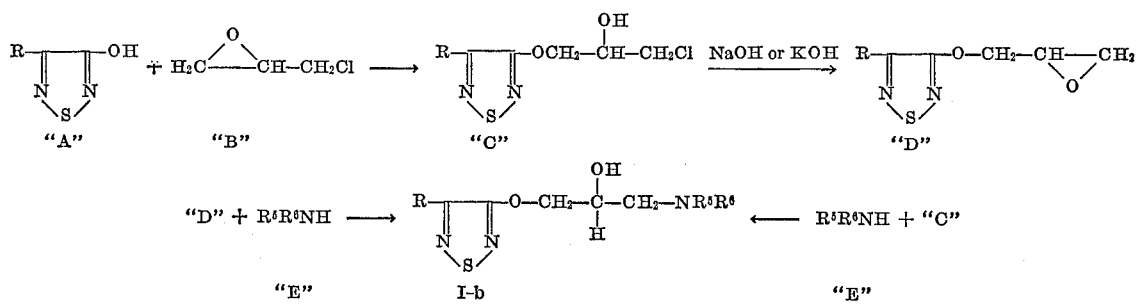

| Ex. No. | R | $R^5$ | $R^6$ | Empirical formula | M.P., °C. | Calcd. C | H | Cl | N | Found C | H | Cl | N | $ED_{50}$, mg./kg |
|---|---|---|---|---|---|---|---|---|---|---|---|---|---|---|
| 4 | H | ⌐(CH₂)₂—O—(CH₂)₂⌐ | | $C_9H_{15}N_3O_3S \cdot HCl$ | 150–2 | 38.86 | 5.72 | 12.58 | 14.91 | 38.55 | 6.02 | 12.78 | 14.88 | 3.1 |
| 5 | $C_2H_5O$ | ⌐(CH₂)₂—O—(CH₂)₂⌐ | | $C_{11}H_{19}N_3O_4S \cdot HCl$ | 124–6 | 40.55 | 6.19 | 10.88 | 12.90 | 41.13 | 6.17 | 11.24 | 12.28 | 1.95 |

EXAMPLE 6

3-morpholino-4-(3-tert-butylamino-2-hydroxybutoxy)-1,2,5-thiadiazole

Step. A.—Preparation of 3-chloro-4-(3-chloro-2-hydroxybutoxy)-1,2,5-thiadiazole: 3-chloro-4-hydroxy-1,2,5-thiadiazole is treated with 2-chloroacetic acid in the presence of ethanolic sodium hydroxide to give 3-chloro-4-carboxymethoxy-1,2,5-thiadiazole. Treatment of this acid with thionyl chloride or oxalyl chloride affords the acid chloride. The acid chloride (1 part) in 20 parts of diethyl ether is treated dropwise at —10° to —15° C. with a slight excess of diazoethane in 30 parts of diethyl ether and the mixture stirred one hour longer at —10° C. The solution is left at room temperature overnight, cooled to —10° to —15° C. and treated with anhydrous hydrogen chloride until evolution of nitrogen is complete. The solution is successively washed with water, a 5% sodium carbonate solution, and water. The dried solution is evaporated to a residue to give 3-chloro-4-(3-chloro-2-oxobutoxy)-1,2,5-thiadiazole. The crude 3-chloro-4-(3-chloro-2-oxobutoxy)-1,2,5-thiadiazole (1 part) in 5 parts of isopropanol is treated at 0–5° C. with a solution containing an excess of sodium borohydride in 5 parts of isopropanol. The mixture is left for 3 to 5 hours at room temperature, then poured onto a mixture of ice and acetic acid, the mixture is extracted with ether, and worked up to give 3-chloro - 4 - (3-chloro-2-hydroxybutoxy)-1,2,5-thiadiazole.

Step B.—Preparation of 3-chloro-4-(3-butylamino-2-hydroxybutoxy)-1,2,5-thiadiazole hydrochloride: A mixture of 1 part of 3-chloro-4-(3-chloro-2-hydroxybutoxy)-1,2,5-thiadiazole and 7.5 parts of butylamine is heated for 10 hours at 100° C. in a sealed vessel. The product is isolated by the method described in Example 1, Step B, to give 3-chloro-4-(3-butylamino-2-hydroxybutoxy)-1,2,5-thiadiazole. The base is dissolved in anhydrous diethyl ether and treated with anhydrous hydrogen chloride to give 3-chloro-4-(3-butylamino-2-hydroxybutoxy)-1,2,5-thiadiazole hydrochloride.

Step C.—Preparation of 3-morpholino-4-(3-butylamino-2-hydroxybutoxy)-1,2,5-thiadiazole: A mixture of 1 part of 3-chloro-4-(3-butylamino-2-hydroxybutoxy)-1,2,5-thiadiazole hydrochloride in 5 parts of freshly distilled morpholine is heated for four hours at 135–40° C. This mixture is refrigerated overnight and the precipitated morpholine hydrochloride is collected and dried. The excess morpholine is removed by distillation in vacuo to give a residual oil which is shaken with 10 ml. of water containing 1.6 g. of sodium hydroxide and extracted with diethyl ether. The combined ethereal extracts are washed sparingly with water and evaporated to dryness. The product is dissolved in anhydrous diethyl ether and treated with excess hydrogen chloride in diethyl ether to give 3 - morpholino-4-(3-butylamino-2-hydroxybutoxy)-1,2,5-thiadiazole which is converted to its hydrochloride salt.

EXAMPLE 7

3-morpholino-4-(3-butylamino-2-hydroxy-1-methylpropoxy)-1,2,5-thiadiazole

Step A.—Preparation of 3-chloro-4-(3-chloro-2-hydroxy-1-methylpropoxy) - 1,2,5 - thiadiazole: 3-chloro-4-(3-chloro-2-hydroxy - 1 - methylpropoxy) - 1,2,5 - thiadiazole is prepared by a sequence of reactions similar to those described in Example 6, Step A. Thus 3-chloro-4-hydroxy-1,2,5-thiadiazole is condensed with 2-bromopropionic acid to give 3-chloro-4-(1-methylcarboxymethoxy)-1,2,5-thiadiazole. The acid is converted by conventional methods to the acid chloride and the acid chloride treated with diazomethane in diethyl ether at —10° to —15° C. The dried ethereal solution is treated with anhydrous hydrogen chloride and the resulting chloroketone reduced with sodium borohydride to give 3-chloro-4-(3 - chloro - 2 - hydroxy-1-methylpropoxy)-1,2,5-thiadiazole.

Step B.—Preparation of 3-morpholino-4-(3-butylamino-2-hydroxy-1-methylpropoxy)-1,2,5-thiadiazole: The procedure set forth in Example 6, Step B, is repeated with the exception that 3-chloro-4-(3-chloro-2-hydroxybutoxy)-1,2,5-thiadiazole is replaced by 3-chloro-4-(3-chloro-2-hydroxy - 1 - methylpropoxy) - 1,2,5 - thiadiazole. Thus 3-chloro - 4 - (3-butylamino-2-hydroxy-1-methylpropoxy)-1,2,5-thiadiazole is obtained and isolated as the hydrochloride salt. Treatment of either 3-chloro-4-(3-butylamino-2-hydroxy-1-methylpropoxy) - 1,2,5 - thiadiazole or its hydrochloride salt with morpholine as described in Example 6 gives 3-morpholino-4-(3-butylamino-2-hydroxy-1-methylpropoxy)-1,2,5-thiadiazole that is isolated as its hydrochloride salt.

EXAMPLE 8

3-morpholino-4-(3-butylamino-2-acetoxypropoxy) 1,2,5-thiadiazole hydrochloride A mixture of 1 part of 3-morpholino-4-(3-butylamino-2-hydroxypropoxy)-1,2,5-thiadiazole, 5 parts of acetic acid, and 1 part of acetic anhydride is left 24 hours at room temperature. The solution is poured on ice, made alkaline with ammonium hydroxide, extracted with ethyl ether, and the ethereal solution dried over anhydrous magnesium sulfate. The ethereal solution is treated with anhydrous hydrogen chloride and the precipitated product is recrystallized from ethanol-diethyl ether to give 3-morpholino - 4 - (3-butylamino - 2 - acetoxypropoxy)-1,2,5-thiadiazole hydrochloride.

EXAMPLE 9

3-morpholino-4-(3-butylamino-2-benzoyloxypropoxy)-1,2,5-thiadiazole hydrochloride A mixture of 1 part of 3-morpholino-4-(3-butylamino-2-hydroxypropoxy)-1,2,5-thiadiazole hydrochloride and 2.5 parts of benzoyl chloride is heated for 4–6 hours at 100° C. The mixture is cooled and added to 25 parts of diethyl ether. The ether is decanted, the remaining solid is slurried with a further 25 parts of diethyl ether, and the mixture is filtered. The collected product is washed several times with further amounts of diethyl ether. The solid is recrystallized from ethanol-diethyl ether to give 3-morpholino-4-(3-butylamino - 2 - benzoyloxypropoxy)-1,2,5-thiadiazole hydrochloride.

The compounds represented by those prepared in Examples 8 and 9, i.e., those in which the 2-hydroxy group of the side chain are esterified are readily converted back to the starting 2-hydroxy compounds by deesterification either with dilute alkali or acid, using standard experimental conditions.

In the following table additional 3-R-4-hydroxy-1,2,5-thiadiazoles that are representative of the starting materials that are and can be prepared by employing the α-amino acid, R—CH(NH$_2$)CO$_2$H, having the R group identified in the following table, which are esterified with methanol (although other lower alkanols can be employed, as ethanol, propanol, isopropanol and the like) to provide the methyl or other lower alkyl ester, which then is converted by treatment with ammonia to give the amide. Reaction of the amide with sulfur monochloride provides the 3-R-4-hydroxy-1,2,5-thiadiazole (product "A") having the group R attached to the carbon present at position 3 identified in the table.

By substituting the thiadiazole products thus obtained in the process of Route I, for example, by replacing the 3-chloro-4-hydroxy-1,2,5-thiadiazole of Example 1 by an equivalent quantity of the 3-R-4-hydroxy-1,2,5-thiadiazole identified in the following table and using an excess of an amine of the structure HNR$^5$R$^6$ (also identified in the table) for the tert-butylamine used in Step B of Example 1, but otherwise following substantially the same procedure there described, the thiadiazole products I–b are obtained having the R, $R^5$ and $R^6$ substituents identified in Table II.

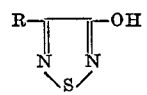

"A"

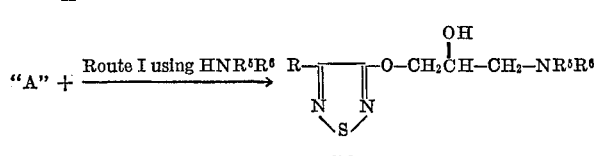

I-b

| R | $R^5$ | $R^6$ |
|---|---|---|
| 2—($C_4H_9$—S)$C_2H_4$— | | ∟$(CH_2)_2$—O—$(CH_2)_2$⌐ |
| 2—[($CH_3$)$_2$CHCH$_2$—S]$C_2H_4$— | | ∟$(CH_2)_2$—O—$(CH_2)_2$⌐ |
| (pyrrole) | | ∟$(CH_2)_2$—N—$(CH_2)_2$⌐ <br> H |
| (pyridyl) | | ∟$(CH_2)_2$—N—$(CH_2)_2$⌐ <br> H |
| (pyridyl) | | ∟$(CH_2)_2$—N—$(CH_2)_2$⌐ <br> $CH_3$ |
| (pyridyl) | | ∟$(CH_2)_2$—N—$(CH_2)_2$⌐ <br> H |

Additional products of this invention that are prepared by the procedures described in Routes I and II and more particularly illustrated by Example 1 and 6 are identified in the following table. Thus, the following products are prepared according to Examples 1 and 6 procedures except that the 3-R-4-hydroxy-1,2,5-thiadiazole starting substances, where necessary, can be prepared by the procedure described above for the products disclose in Table II.

TABLE III

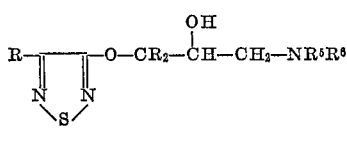

I-b

| R | $R^5$ | $R^6$ |
|---|---|---|
| $(CH_3)_2CH$— | —$CH(CH_3)_2$ | —$CH(CH_3)_2$ |
| $(CH_3)_2CH$— | —$CH_3$ | —$CH(CH_3)_2$ |
| (piperidinyl H N—) | —$CH(CH_3)_2$ | —$CH_2$—$C_6H_5$ |
| HO—(piperidinyl H N—) | —$C_2H_5$ | —$C_2H_5$ |
| (morpholino O H N—) | —$C_4H_9$ | —$C_4H_9$ |
| Cl | —$CH_3$ | —$CH_3$ |
| Cl | —$C_2H_5$ | —$C_4H_9$ |
| (morpholino O H N—) | —$C_2H_5$ | —$(CH_2)_2$—O—⟨⟩—Cl |
| $CH_2$=CH— | —$CH_2$—$C_6H_5$ | —$CH(CH_3)$—C≡CH |
| $C_6H_5$— | —$CH_2$—$C_6H_5$ | —$CH(CH_3)_2$ |
| $C_2H_5$— | —$OCCH_3$ | —$CH(CH_3)_2$ |

TABLE—Continued

| R | $R^5$ | $R^6$ |
|---|---|---|
| (piperidinyl H N—) | | ∟——$(CH_2)_5$——⌐ |
| (morpholino O H N—) | | ∟——$(CH_2)_2$—O—$(CH_2)_2$——⌐ |
| (piperidinyl H N—) | | ∟——$(CH_2)_4$——⌐ |
| HO—(piperidinyl H N—) | | ∟——$CH_2$—CH=CH—$(CH_2)_2$——⌐ |
| (piperidinyl H N—) | | ∟——CH=CH—$(CH_2)_3$——⌐ |
| $C_2H_5O$— | | ∟——$CH_2$CH=CH—CH=CH——⌐ |
| (thiomorpholino S H N—) | | ∟——$(CH_2)_2$—S—$(CH_2)_2$——⌐ |

The invention further provides pharmaceutical compositions comprising, as active ingredient, at least one of the compounds according to the invention in association with a pharmaceutical carrier or excipient. The compounds may be presented in a form suitable for oral, rectal or parenteral administration. Thus, for example, compositions for oral administration may be solid or liquid and may take the form of capsules, tablets, coated tablets, suspensions, etc., such compositions comprising carriers or excipients conveniently used in the pharmaceutical art. Thus suitable tabletting excipients include lactose, potato and maize starches, talc, gelatine, stearic acid, magnesium stearate, polyvinyl pyrrolidone, or other known tabletting substances.

For the parenteral administration, the carrier or excipient may be a sterile, parenterally acceptable liquid, e.g., pyrogen-free water or an aqueous solution of polyvinyl pyrrolidone, or a parenterally acceptable oil, e.g., arachis oil, contained in ampoules.

In compositions for rectal administration, the carrier may comprise a suppository base, e.g., cocoa butter or a glyceride.

Advantageously, the compositions may be formulated as dosage units, each unit being adapted to supply a fixed dose of active ingredient. Tablets, coated tables, capsules, ampoules and suppositories are examples of preferred dosage unit forms according to the invention. Each dosage unit adapted for oral administration may conveniently contain 1 to 20 mg., and preferably 2 to 10 mg., of the active ingredient; each dosage unit adapted for parenteral administration may conveniently contain 0.1 to 5 mg., and preferably 0.1 to 1 mg., of the active ingredient.

What is claimed is:

1. A 1,2,5-thiadiazole having the structure

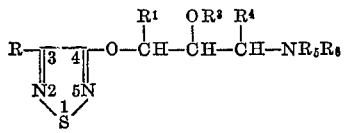

or a pharmacologically acceptable salt thereof wherein at least one of the variable radicals $R^1$, $R^3$, $R^4$, $R^5$ is other than hydrogen and wherein R is selected from the group consisting of hydrogen, chloro, bromo, $C_{1-5}$ alkyl, $C_{2-5}$ mono-alkenyl, $C_{1-4}$ alkylthio-$C_{1-2}$ alkyl, $C_{1-5}$ alkoxy, phenyl, morpholino and pyrryl;

$R^1$ is selected from the group consisting of hydrogen and $C_{1-3}$ alkyl;

$R^3$ is selected from the group consisting of hydrogen, $C_{2-4}$ alkanoyl and benzoyl;

$R^4$ is selected from the group consisting of hydrogen and $C_{1-3}$ alkyl;

$R^5$ is selected from the group consisting of hydrogen, $C_{1-5}$ alkyl, phenyl-$C_{1-3}$ alkyl and $C_{2-5}$ alkanoyl; and $R^6$ is selected from the group consisting of $C_{3-6}$ alkyl, halophenoxy-$C_{3-6}$ alkyl, $C_{2-6}$ alkenyl, and $C_{3-6}$ alkinyl; and $R^5$ and $R^6$ when joined together form a heterocyclic ring with the nitrogen to which they are attached selected from morpholino, piperidino, 1-pyrrolidyl, hexahydro-1-azepinyl, 1,2-dihydro-1-pyridyl, 1,4,5,6-tetrahydro-1-pyridyl and 1,2,5,6-tetrahydro-1-pyridyl.

2. A 1,2,5-thiadiazole as claimed in claim 1 wherein R is hydrogen.

3. 4 - (3-morpholino-2-hydroxypropoxy)-1,2,5-thiadiazole or a pharmacologically acceptable salt thereof.

4. A 1,2,5-thiadiazole as claimed in claim 1 wherein R is lower alkoxy.

5. 3 - ethoxy - 4 - (3-morpholino-2-hydroxypropoxy)-1,2,5-thiadiazole or a pharmacologically acceptable salt thereof.

6. A 1,2,5-thiadiazole as claimed in claim 1 wherein R is morpholino.

7. 3 - morpholino - 4 - (3-methyl-3-tert-butylamino-2-hydroxypropoxy)-1,2,5-thiadiazole or a pharmacologically acceptable salt thereof.

8. 3 - morpholino - 4-(3-tert-butylamino-2-hydroxy-1-methylpropoxy)-1,2,5-thiadiazole or a pharmacologically acceptable salt thereof.

9. 3 - morpholino - 4-(3 - tert-butylamino-2-$OR^3$-propoxy)-1,2,5-thiadiazole wherein $R^3$ is selected from the group consisting of lower alkanoyl and benzoyl or a pharmacologically acceptable salt thereof.

No references cited.

ALEX MAZEL, Primary Examiner

J. TOVAR, Assistant Examiner

U.S. Cl. X.R.

260—302SD, 302H, 302D, 294.8D, 293.68; 424—248